(12) United States Patent
Kuwahara et al.

(10) Patent No.: US 6,261,076 B1
(45) Date of Patent: Jul. 17, 2001

(54) APPARATUS FOR MANUFACTURING MARBLE CANDY

(75) Inventors: Rikiya Kuwahara; Junko Igarashi; Makoto Nagasawa, all of Saitama (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 0 days.

(21) Appl. No.: 08/390,029

(22) Filed: Feb. 17, 1995

(30) Foreign Application Priority Data

Feb. 21, 1994 (JP) .................................................. 6-022453

(51) Int. Cl.[7] .................................................. B29C 47/04
(52) U.S. Cl. .................... 425/132; 425/382.4; 425/462; 426/249; 222/376; 222/380
(58) Field of Search .................... 222/376, 380, 222/384, 385; 264/171.1, 177.11, 172.13; 425/131.1, 132, 375, 382.4, 462; 426/249

(56) References Cited

U.S. PATENT DOCUMENTS

| | | | |
|---|---|---|---|
| 163,828 | * 5/1875 | Wenzel | 425/131.1 |
| 2,409,339 | 10/1946 | Ballard . | |
| 2,479,261 | 8/1949 | Reetz . | |
| 2,680,414 | 6/1954 | Balch . | |
| 2,816,518 | 12/1957 | Daggett . | |
| 3,014,437 | * 12/1961 | Dutchess | 425/131.1 |
| 3,048,128 | 8/1962 | Warren et al. . | |
| 3,653,336 | * 4/1972 | Kaneko et al. | 425/132 |
| 3,722,758 | 3/1973 | Warren et al. | 222/385 |
| 3,752,617 | * 8/1973 | Burlis et al. | 425/131.1 |
| 4,262,709 | 4/1981 | Mayfield | 141/67 |
| 4,372,734 | * 2/1983 | Dolan et al. | 425/131.1 |
| 4,483,669 | * 11/1984 | Hahn et al. | 425/382.4 |
| 4,542,686 | * 9/1985 | Bansal | 425/131.1 |
| 5,122,322 | * 6/1992 | Momose | 425/131.1 |

FOREIGN PATENT DOCUMENTS

| | | |
|---|---|---|
| A10235508 | 9/1987 | (EP) . |
| 2167536 | 8/1973 | (FR) . |
| A2060084 | 4/1981 | (GB) . |
| 52-30535 | * 8/1977 | (JP) ........................... 425/131.1 |

* cited by examiner

Primary Examiner—C. Scott Bushey
(74) Attorney, Agent, or Firm—Sughrue, Mion, Zinn, Macpeak & Seas, PLLC

(57) ABSTRACT

Candy mass including sugar and starch syrup is passed through a nozzle to which twisted-blades are mounted by a pair of a piston and a deposit cylinder for deposit, the candy mass being poured into a die. Consequently, candies having a beautiful marble pattern can be produced continuously.

7 Claims, 2 Drawing Sheets

APPARATUS FOR MANUFACTURING MARBLE CANDY

BACKGROUND OF THE INVENTION

1. Field of the Invention

The present invention relates to a manufacturing method and apparatus for a candy which has a marble pattern. Specifically, the present invention relates to a manufacturing method and apparatus in which a deposit cylinder and a nozzle to which a twisted-blade is installed are used so that a hard candy having a marble-patterned exterior is manufactured by a depositting-type method.

2. Description of the Conventional Art

Conventionally, in order to add a joy to the exterior of a hard candy, many kinds of candies having a marble pattern comprised of two or more colors have been manufactured. Such candies are manufactured by so-called stamping method described below. In this method, generally, two or more candies having different colors are manufactured respectively, and thereafter the candies are cooled down to the temperature of 70 to 80° C. The cooled candies are stacked or pasted to be mixed together to form a candy lump having a marble pattern, and thereafter the candy lump are elongated to be a rope-like shape to which a stamping operation is conducted, thereby forming the candy having a marble pattern. (hereinafter, referred to marble candy) In addition, recently, so-called double deposit method has been developed by APV Co, Ltd. (England), in which a depositting-type apparatus having two pairs of a deposit cylinder and a piston is used to manufacture the marble candy.

However, candies manufactured by the stamping method has a problem that large bubbles are easy to be inserted into the candies. The candies to which the bubbles are inserted are not soft to a tongue. In addition, since the double deposit method should use two pairs of the deposit cylinder and the piston to manufacture the candies, its manufacturing ability is inferior.

The present invention has been accomplished to improve the disadvantages of the above conventional manufacturing method of the candy.

SUMMARY OF THE INVENTION

It is an object of the present invention to provide a method and apparatus for manufacturing a marble pattern candy which is soft to a tongue, the apparatus having a high manufacturing ability and a simple structure.

The manufacturing apparatus for the marble pattern candy of the present invention comprises: a plurality of hoppers in which differently colored candy masses are stored, the hoppers being provided independently; a pair of a deposit cylinder and a piston moving downward and upward within the deposit cylinder to simultaneously imbibe the candy masses into the deposit cylinder; a nozzle having a twisted-blade, the imbibed candy masses passing through the nozzle to be mixed together to be a marble candy; and a die into which the marble candy is poured. The candy manufactured by this apparatus has a beautiful marble pattern and is soft to a tongue. Further, this apparatus can continuously manufacture the marble candies as similar to the conventional depositting-type method.

BRIEF DESCRIPTION OF THE DRAWINGS

In the accompany drawings.

PREFERRED EMBODIMENTS OF THE INVENTION

The present invention will be described specifically as follows referring to the accompanying drawings.

Figure 1:
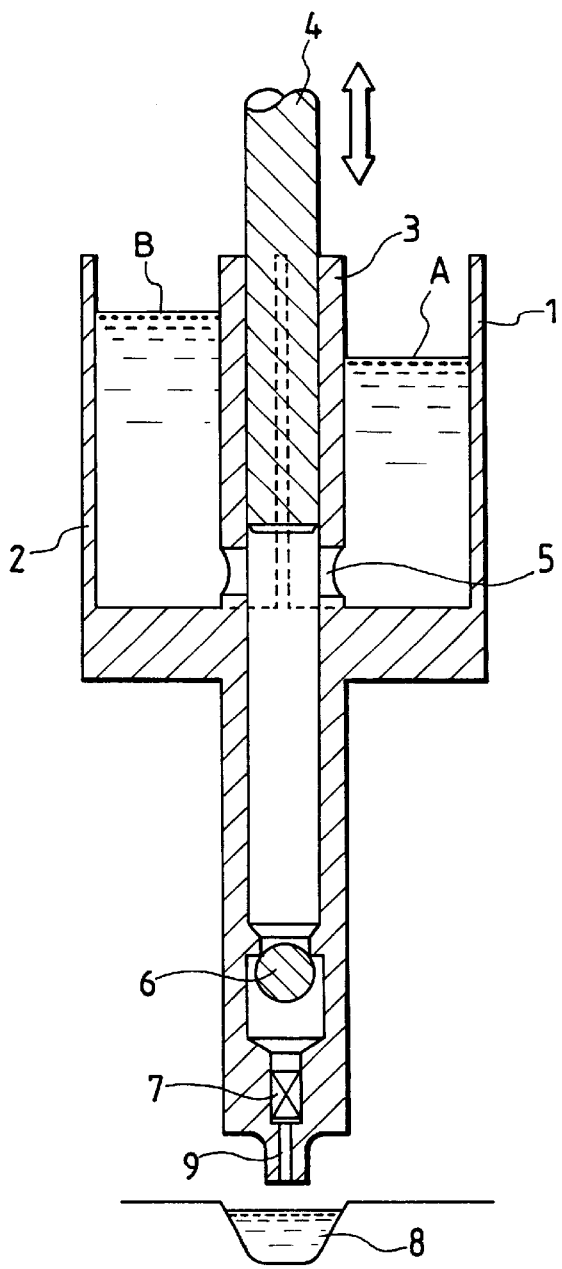
FIG. 1 is a sectional view showing one embodiment of a marble candy manufacturing apparatus of the present invention.
Figure 2:
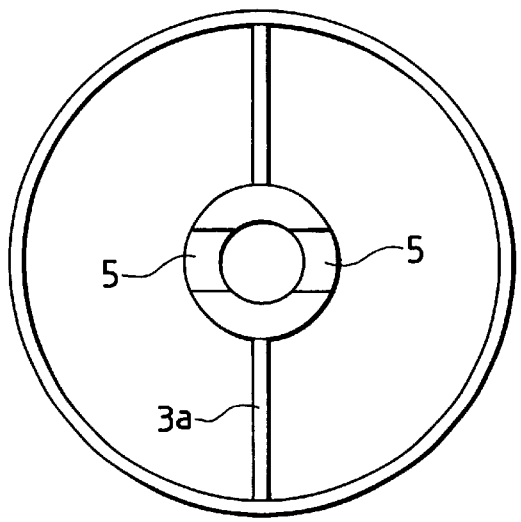
FIG. 2 is a sectional view showing a lower portion of the apparatus of the present invention.
Figure 3:
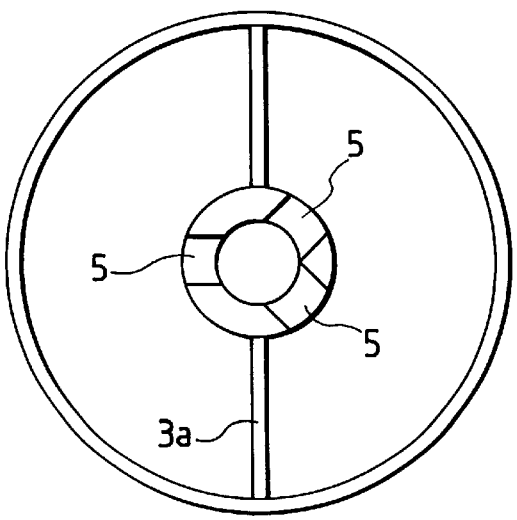
FIG. 3 is a sectional view showing an application example of syrup imbibing openings as shown FIG. 2.
Figure 6:
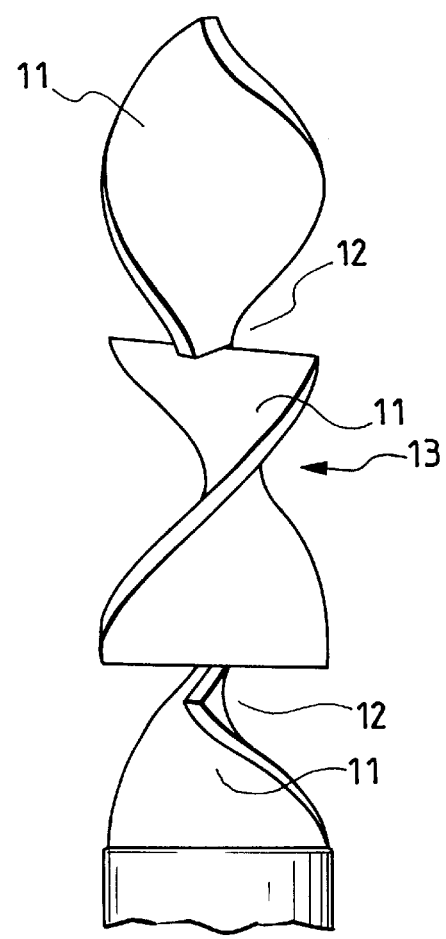
FIG. 6 is a perspective view showing a twisted-blade.

As shown in FIG. 1, colored candy masses A and B including sugar, starch syrup or corn syrup, one of color dyes and the like are supplied into hoppers 1 and 2, respectively. As shown in FIG. 2, the hoppers 1 and 2 are provided independently by partition plates 3a. First, a piston 4 moves upward so that the candy masses A and B are imbibed into a cylinder 3 through a syrup imbibing opening 5. Second, the piston 4 moves downward so that thus imbibed candy masses A, B push to open a check valve 6 and pass through a nozzle 9 to which a twisted-blade 7 shown in FIG. 6 is installed. Consequently, the candies are mixed together to be a marble candy which is poured into a die 8. Here, the check valve 6 opens and closes in accordance with the movement of the piston 4. Namely, the check valve 6 is opened when the piston 4 moves downward and closed when it moves upward so as to prevent the back flow of the candy masses.

The colored candy masses A and B are imbibed in the cylinder 3 laminatedly. Accordingly, if there are no twisted-blades, the mixed candy has a pattern which two colors exist partially and no marble pattern is present. Further, if a large number of twisted-blades are provided, two candy masses A and B are sufficiently mixed so as not to be a marble candy. Therefore, it is necessary to change the number of twisted-blades in accordance with the viscosity of the candy being manufactured. Generally, the viscosity is higher as the number of twisted-blades increases. In addition, the twisted-blade 7 can be self-made or cut from a purchased product. A blade 13 is given cuts 12 of a predetermined length and each unit 11 on either side of the cuts 12 are twisted at the angle of substantially 90° with respect to the adjacent unit 11.

Figure 4:
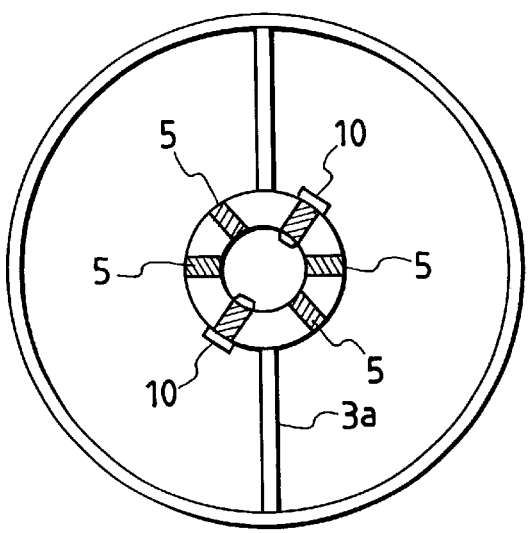
FIG. 4 is a sectional view showing another application example of the syrup imbibing openings.

Further, the number of the imbibing openings or the cross section thereof may be changed to change the ratio of two colored candy masses in the final product (marble candy). For example, as shown in FIG. 4, several screw openings are opened at the periphery of the cylinder 3 as the syrup imbibing openings 5. Some of the openings are stopped up by bolts 10 to change the number of the imbibing openings 5. Accordingly, the ratio of two colored candy masses can be changed more easily.

Figure 5:
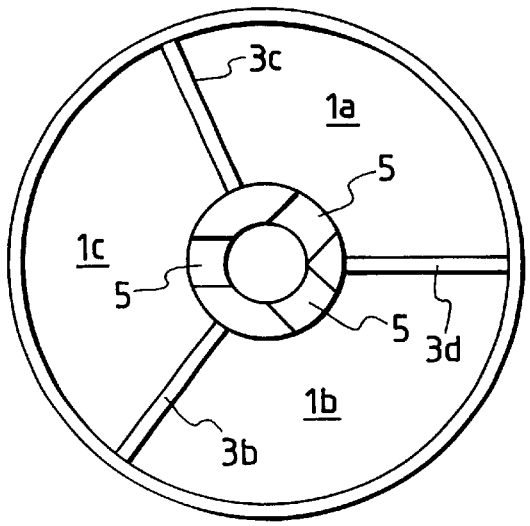
FIG. 5 is a sectional view showing a lower portion of the apparatus of another embodiment.

Here, in this apparatus of the present invention, three or more candy masses can be simultaneously imbibed into the cylinder. As shown in FIG. 5, three hoppers 1a, 1b and 1c are provided to be separated by the partition plates 3b, 3c and 3d to which the candy masses having different colors are supplied. In such a structure, marble candies having three different colors can be continuously manufactured.

EXAMPLE

TABLE 1

| | Colored Candy mass A Weight % |
|---|---|
| Sugar | 59.8 |
| Starch syrup | 40.0 |
| Yellow Dye | 0.2 |
| | 100.0 |

TABLE 2

| | Colored Candy mass B Weight % |
|---|---|
| Sugar | 59.8 |
| Starch syrup | 40.0 |
| Red Dye | 0.2 |
| | 100.0 |

Water (20 weight %) was added to thus mixed sugar and starch syrup of the above mixtures as shown in Tables 1 and 2, which were boiled at 150° C., respectively. Next, the yellow and red dye were added to mixtures as shown in Tables 1 and 2, respectively, which are mixed sufficiently to produce candy masses having different colors. Then, the candy masses were supplied into the hopper A and B, respectively. Providing two twisted-blades, a manufactured candy had a beautiful marble pattern.

Candy masses having different colors were imbibed simultaneously into the cylinder by using a pair of the piston and the deposit cylinder, and the candy masses were passed through the nozzle to which the twisted-blades are installed to be poured into the die. Consequently, beautiful marble patterned candies being soft to a tongue without bubbles could be manufactured continuously as similar to the general pouring type method.

What is claimed is:

1. An apparatus for manufacturing marble candy comprising:

a plurality of hoppers in which differently colored candy masses are stored, said hoppers being provided independently;

a deposit cylinder;

a plurality of syrup imbibing openings through which candy masses are imbibed from said plurality of hoppers into said cylinder;

a piston moving downward and upward within said deposit cylinder to simultaneously imbibe said candy masses from the plurality of hoppers into the deposit cylinder through said plurality of syrup imbibing openings;

a nozzle having at least one twisted-blade, said imbibed candies passing through said nozzle and said twisted-blade to form a marble candy; and a die into which said marble candy is poured;

wherein a cross section of at least one opening of said plurality of syrup imbibing openings is different from that of the other openings.

2. An apparatus for manufacturing marble candy as defined in claim 1, wherein the nozzle further comprises a plurality of twisted blades.

3. An apparatus for manufacturing marble candy as defined in claim 1 further comprising a check valve provided between said plurality of syrup imbibing openings and said twisted-blade, said check valve being opened when said piston moves downward and closed when said piston moves upwards to prevent a back flow of said imbibed candies.

4. An apparatus for manufacturing marble candy comprising:

a plurality of hoppers in which differently colored candy masses are stored, said hoppers being provided independently;

a deposit cylinder;

a plurality of syrup imbibing openings through which candy masses are imbibed from said plurality of hoppers into said cylinder, said plurality of syrup imbibing openings being provided between at least one of said hoppers and said cylinder;

imbibing openings stopping-up means for stopping up at least one of said plurality of syrup imbibing openings;

a piston moving downward and upward within said deposit cylinder to simultaneously imbibe said candy masses from the plurality of hoppers into the deposit cylinder;

a nozzle having at least one twisted-blade, said imbibed candies passing through said nozzle and said twisted-blade to form a marble candy; and a die into which said marble candy is poured.

5. An apparatus for manufacturing marble candy as defined in claim 4, wherein the stopping-up means comprises a bolt.

6. An apparatus for manufacturing marble candy as defined in claim 4, wherein the nozzle further comprises a plurality of twisted blades.

7. An apparatus for manufacturing marble candy as defined in claim 4 further comprising a check valve provided between said plurality of syrup imbibing openings and said twisted-blade, said check valve being opened when said piston moves downward and closed when said piston moves upwards to prevent a back flow of said imbibed candies.

* * * * *